(12) United States Patent
Qu et al.

(10) Patent No.: US 10,605,537 B2
(45) Date of Patent: Mar. 31, 2020

(54) DEVICE AND METHOD FOR FILLING DUAL PROCESS INTERFACE HEAT PIPE WITH SOLID WORKING MEDIA

(71) Applicant: CHINA ACADEMY OF AEROSPACE AERODYNAMICS, Beijing (CN)

(72) Inventors: Wei Qu, Beijing (CN); Bangcheng AI, Beijing (CN); Jijun Yu, Beijing (CN); Zhihu Xue, Beijing (CN)

(73) Assignee: China Academy Of Aerospace Aerodynamics (CN)

( * ) Notice: Subject to any disclaimer, the term of this patent is extended or adjusted under 35 U.S.C. 154(b) by 493 days.

(21) Appl. No.: 15/322,616

(22) PCT Filed: Jul. 25, 2014

(86) PCT No.: PCT/CN2014/082966
§ 371 (c)(1),
(2) Date: Feb. 1, 2017

(87) PCT Pub. No.: WO2016/000286
PCT Pub. Date: Jan. 7, 2016

(65) Prior Publication Data
US 2017/0138672 A1    May 18, 2017

(30) Foreign Application Priority Data

Jun. 30, 2014 (CN) .......................... 2014 1 0306757

(51) Int. Cl.
*F28D 15/02* (2006.01)
*B23P 15/26* (2006.01)

(52) U.S. Cl.
CPC .............. *F28D 15/02* (2013.01); *B23P 15/26* (2013.01); *F28D 15/0283* (2013.01)

(58) Field of Classification Search
CPC .................................. F28D 15/02; B23P 15/26
See application file for complete search history.

(56) References Cited

U.S. PATENT DOCUMENTS

2006/0183374 A1    8/2006    Shih et al.

FOREIGN PATENT DOCUMENTS

| CN | 101995181 A | 3/2011 |
| CN | 102735084 A | 10/2012 |

(Continued)

OTHER PUBLICATIONS

Machine Translation of CN101995181A by Wei Qu and Bin Yu. Mar. 30, 2011 (Year: 2011).*

(Continued)

*Primary Examiner* — David P Bryant
*Assistant Examiner* — Nirvana Deonauth
(74) *Attorney, Agent, or Firm* — BakerHostetler

(57) ABSTRACT

A solid working medium filling device for heat pipe with double process ports includes a working medium tank, an upper cover, an inert gas source and a vacuum molecular pump set. The upper cover is arranged on an upper side of the working medium tank, a process port in the upper cover is in communication with the inert gas source and the vacuum molecular pump set respectively. A heat pipe to be filled includes two process ports, in which a main process port is a vacuumizing port and an inert gas passage port as well as a working medium filling port; and an auxiliary process port is a vacuumizing port as well as a port for inert gas passage. Size of an exhaust passage of the heat pipe and the process tank is doubled, exhausting and vacuumizing are smooth and the filling range can be enlarged as required.

28 Claims, 11 Drawing Sheets

(56) References Cited

FOREIGN PATENT DOCUMENTS

| | | |
|---|---|---|
| CN | 102878840 A | 1/2013 |
| JP | H0415490 A | 1/1992 |
| JP | H04344095 A | 11/1992 |

OTHER PUBLICATIONS

International Patent Application No. PCT/CN2014/082966: International Search Report dated Mar. 4, 2015, 12 pages.
Tongze et al., "Heat Pipe", Science Press, 1991, 277-282.

* cited by examiner

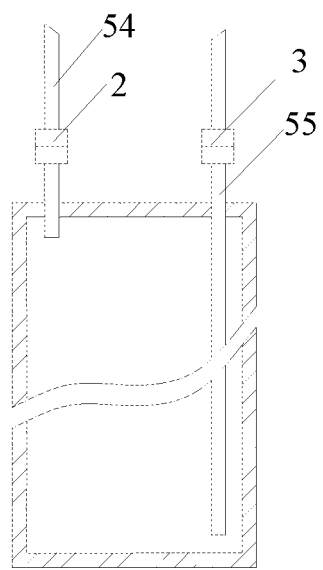 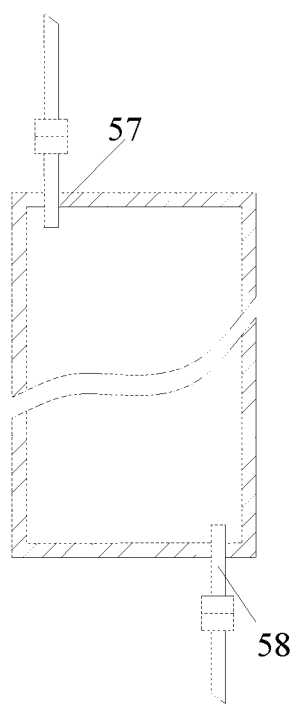 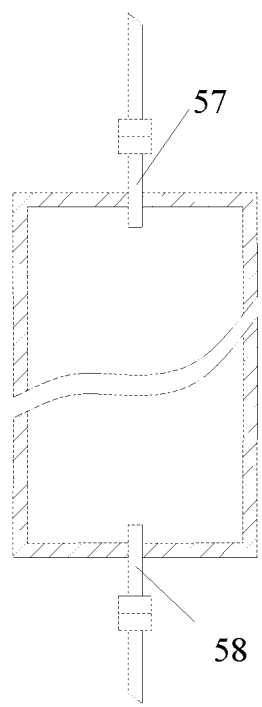
Figure 6a     Figure 6b     Figure 6c
Figure 6

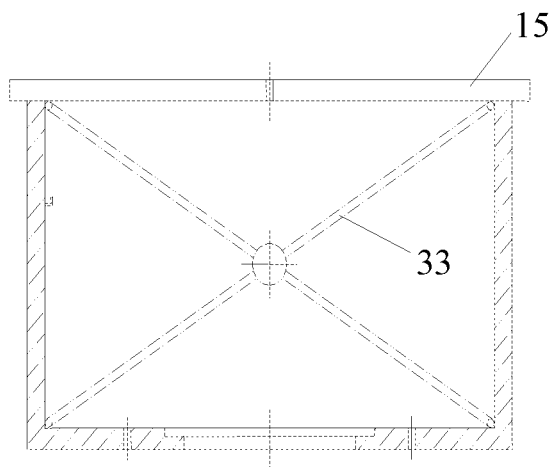
Figure 7a
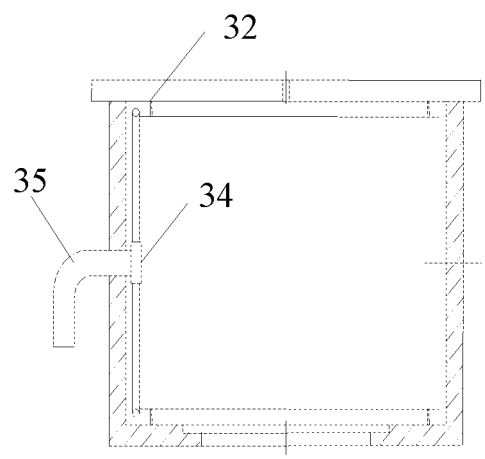
Figure 7b
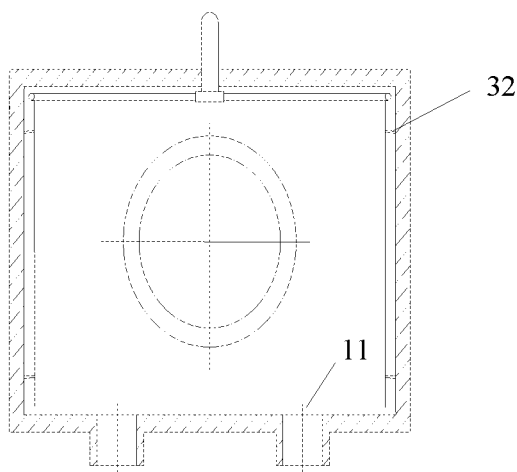
Figure 7c
Figure 7

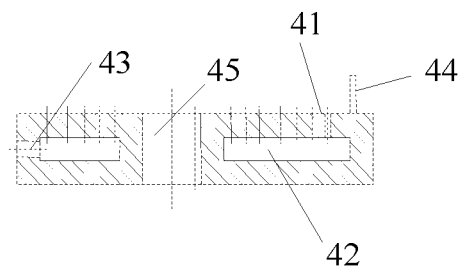
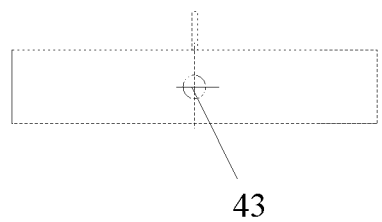
Figure 8a          Figure 8b
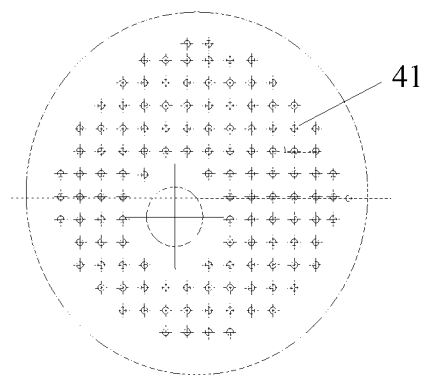
Figure 8c
Figure 8

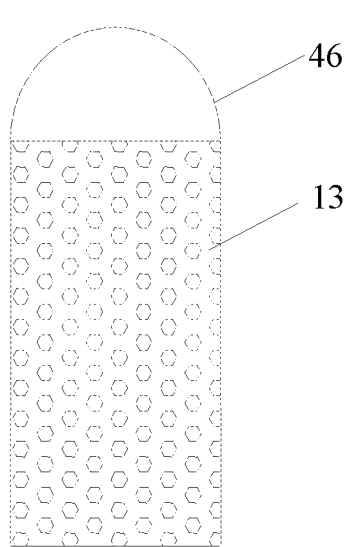
Figure 9a
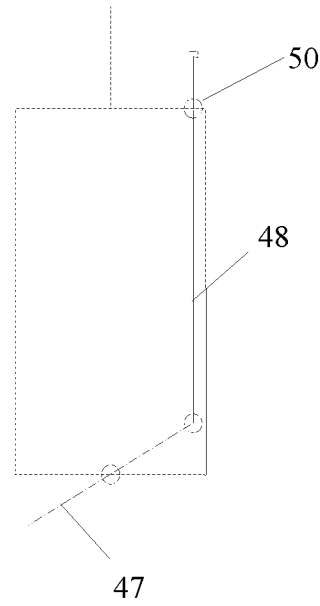
Figure 9b
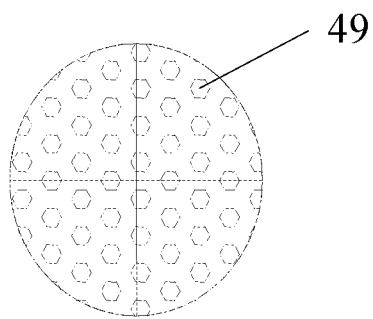
Figure 9c
Figure 9

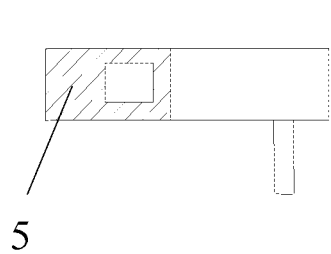
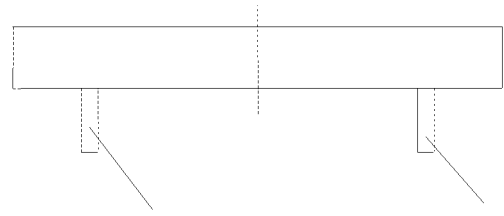
Figure 10a　　　　　　　　Figure 10b
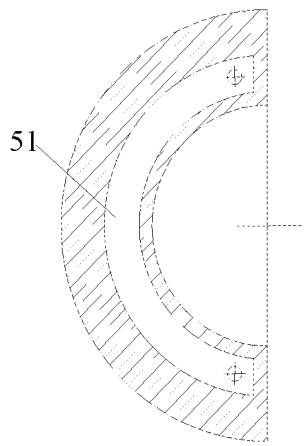
Figure 10c
Figure 10

US 10,605,537 B2

DEVICE AND METHOD FOR FILLING DUAL PROCESS INTERFACE HEAT PIPE WITH SOLID WORKING MEDIA

CROSS-REFERENCE TO RELATED APPLICATIONS

This application is the national phase of International Application No. PCT/CN2014/082966, titled "DEVICE AND METHOD FOR FILLING DUAL PROCESS INTERFACE HEAT PIPE WITH SOLID WORKING MEDIA", filed on Jul. 25, 2014 which claims the benefit of priority to Chinese patent application No. 201410306757.3, titled "SOLID WORKING MEDIUM FILLING DEVICE AND METHOD FOR HEAT PIPE WITH DOUBLE PROCESS PORTS", filed with the Chinese State Intellectual Property Office on Jun. 30, 2014, the entire disclosures of which applications are incorporated herein by reference.

TECHNICAL FIELD

The present application relates to a device and method for filling a double process ports heat pipe with solid working media, and pertains to the technical field of key technical process of heat pipe of engineering thermophysics.

BACKGROUND

The concept of heat pipes has been extended to plate-type heat pipes (two-dimensional) and even heat pipe steam chamber (three-dimensional). Currently, for meeting the requirement of special thermal control applications, the outline and inner space of the heat pipes to be designed are continuously increasing, and the demand for plate-type heat pipes and the heat pipe steam chamber with a large filling volume is continuously increasing.

High-temperature heat pipes (when a working temperature reaches 500 degrees Celsius or is greater than 500 degrees Celsius) and ultra-high temperature heat pipes (when a working temperature reaches 1200 degrees Celsius or is greater than 1200 degrees Celsius) generally employ alkali metal, lead, silver, etc. as a working medium. Most of these working media are in a solid state at a normal temperature, and some of these working media are extremely easily oxidized. Under normal conditions, the alkali metal working media are in a solid state at the normal temperature and are easily oxidized even in poor oxygen conditions, thus inert gas protection is very important in the technical process. In addition, different alkali metals have different melting points, thus imposing increasingly high requirements on filling of the working media. Under the condition of the conventional heat pipe process technology, filling methods in the conventional technology cannot meet the requirements of heat pipe filling such as a stable process, non-oxidation, a large range, a precise quantitative filling and a convenient operation.

In the process of alkali metal split charging, it should be ensured that: the heat pipe has a sufficiently high vacuum degree; and a quantity of the working medium filled can be controlled; the working medium filled has a high purity, that is, meets the requirements of high purity working medium. For ultra-high temperature heat pipes, for example, taking lithium as the working medium, the previous split charging methods for alkali metals such as sodium, potassium are not applicable any more, which demonstrates in aspects that the filling process is not sufficiently stable, the filling method is not adaptable to filling heat pipes with a large filling range, the post-treatment is troublesome, and the heat pipes filled have a short service life. In respect of filling heat pipes with sodium, there are four typical conventional filling technologies as follows.

(1) The process for distilling and filling metallic sodium, for example, the document "HEAT PIPE written by Ma Tongze, Hou Zengqi, Wu Wenguang published in 1991 by Science Press with ISBN 7-03-002011-1 on pages 277 to 282" introduces a method for distilling and filling sodium, as shown in FIG. 1. In this distillation process method, the process changes of alkali metal are controlled to be from solid state→liquid state→gaseous state→liquid state→solid state. The process and device are complex, a long time is consumed, the post-treatment is troublesome, and precise quantitative filling is difficult to be achieved.

(2) A quantitative filling device and method of solid alkali metal working media (invented by Qu Wei and Yu Bin with Application No. 200910091897.2) is as shown in FIG. 2. This method uses a filtering process, and the process changes of alkali metal are controlled to be from solid state→liquid state→liquid state→solid state. Compared with the method described in Technology (1), the process is simpler, however, since exhausted gas of the connected heat pipe needs to pass through the working medium, a vacuum resistance is large and the vacuum degree required is not easy to reach. In addition, a vacuum glove cartridge falls into an open inert gas protection, a small part of alkali metal is still oxidized during the split charging process, which may adversely affect the final performance of the heat pipe.

(3) An accurate filling equipment and method for high temperature heat pipe requiring small amount of alkali metal working medium (invented by Qu Wei, Duan Yanjun with Application No. 201110088089) is as shown in FIG. 3. Compared with the method described in Technology (2), a bypass structure is adopted, and a heating device is embodied as a peripheral heating belt. Due to using the heating belt to peripherally heat, the method for winding the heating belt has a significant effect on the temperature control, and the process is not sufficiently stable. Further, the winding process is troublesome, an insulation material of the heating belt used is volatile, which may have an adverse effect on operators. In addition, the vacuum glove cartridge falls into the open inert gas protection, there is still a small part of the alkali metal oxidized during the split charging, which also restricts the improvement of final performance of the heat pipe.

(4) An non-Oxidation split charging method and integrated device for alkali metal working medium (invented by Qu Wei, Ai Bangcheng, Yu Jijun, Xue Zhihu with Application No. 201210378002.5) is as shown in FIG. 4. Compared with the method described in Technology (3), four suction-exhaust pipes are employed inside the glove box, and gas exhaust and suction of each pipe to two corner areas where the pipe passes is not uniform enough. A built-in balance occupies most of the space inside the glove box, and a filling quantity defined by the process method and device is also not large. A wall surface of the process tank has a complex structure, which is not easy to assemble and disassemble. Reference numerals in FIG. 4 are described as follows: 101 working medium tank, 102 glove box upper cover (transparent), 103 main intake pipe (inert gas), 104 first ultrahigh vacuum sealing valve, 105 second ultrahigh vacuum sealing valve, 106 third ultrahigh vacuum sealing valve, 107 ultra-high-vacuum molecular pump set, 108 fourth intake valve, 109 first intake pipe, 110 fifth intake valve, 111 sixth intake valve, 112 seventh exhaust valve, 201 working medium tank, 205 cooling water inlet, 206 cooling water outlet, 208 screw hole for fixing heating rod, 209 working medium tank sealing lower flange, 210 sealing grid, 211 working medium tank sealing upper flange, 212 branch air suction bypass, 213 branch inert gas intake bypass, 301 glove operation box, 302 glove opening, and 303 exhaust manifold.

SUMMARY

An object of the present application is to overcome the above deficiencies in the conventional technology, to provide a solid working medium filling device for a heat pipe with double process ports, to achieve the goals that the heat pipe filling range can be enlarged as required, no working medium remnant exists in a pipeline during the filling, the process is stable, the working medium has a high purity, and the post-processing is more convenient, and the heat pipe has a superior performance and a long service life, etc.

Another object of the present application is to provide a filling method for a solid working medium filling device for heat pipe with double process ports.

The above objects of the present application are achieved mainly by the following technical solutions.

A solid working medium filling device for heat pipe with double process ports, the device includes a working medium tank, an upper cover, an inert gas source, and a vacuum molecular pump set. The upper cover is arranged on an upper side of the working medium tank, a process port in the upper cover is in communication with the inert gas source and the vacuum molecular pump set respectively; a heat pipe to be filled includes two process ports which are respectively a main process port and an auxiliary process port, the heat pipe to be filled is in communication with a bottom of the working medium tank via the main process port to allow the main process port to be a vacuumizing port and an inert gas passage port as well as a working medium filling port; and the heat pipe to be filled is in communication with the inert gas source and the vacuum molecular pump set via the auxiliary process port to allow the auxiliary process port to be a vacuumizing port as well as a port for inert gas passage.

In the solid working medium filling device for heat pipe with double process ports, the device further includes a glove box and a heater, a top end of the working medium tank protrudes into the glove box through a through hole in a bottom surface of the glove box and is fitted closely with the glove box, a tank body and a bottom end of the tank body are located outside the glove box; and a tank body and the bottom end of the tank body of the working medium tank, the heat pipe to be filled, a connecting pipe between the working medium tank and the heat pipe to be filled are heated by the heater.

In the solid working medium filling device for heat pipe with double process ports, the main process port and the auxiliary process port of the heat pipe to be filled are located on a same end of the heat pipe to be filled, or the main process port and the auxiliary process port are located on two ends of the heat pipe to be filled respectively.

In the solid working medium filling device for heat pipe with double process ports, in the case that the main process port and the auxiliary process port are located on the same end of the heat pipe to be filled, a main process port pipe connected to the main process port protrudes perpendicularly into one end of a housing of the heat pipe to be filled by 0 mm to 10 mm; and an auxiliary process port pipe connected to the auxiliary process port protrudes perpendicularly into the heat pipe to be filled and is distanced from another end of the housing of the heat pipe to be filled by 0 mm to 10 mm.

In the solid working medium filling device for heat pipe with double process ports, in the case that the main process port and the auxiliary process port are located on the two ends of the heat pipe to be filled respectively, a main process port pipe connected to the main process port protrudes perpendicularly into one end of a housing of the heat pipe to be filled by 0 mm to 10 mm; and an auxiliary process port pipe connected to the auxiliary process port protrudes perpendicularly into another end of the housing of the heat pipe to be filled by 0 mm to 10 mm.

In the solid working medium filling device for heat pipe with double process ports, in the case that the heat pipe to be filled is a plate like structure, a vertical distance between a central line of the main process port pipe and a central line of the auxiliary process port pipe ranges from one-second to nine-tenths of a length of a side, where the main process port pipe or the auxiliary process port pipe is connected to the heat pipe to be filled, of the plate like structure.

In the solid working medium filling device for heat pipe with double process ports, the device further includes a cooler, a flange gasket of the working medium tank is cooled by the cooler while the working medium tank is being heated by the heater.

In the solid working medium filling device for heat pipe with double process ports, the cooler is a cooling ring formed by two cooling half rings, and is sleeved on an outer wall surface of the working medium tank, each of the cooling half rings is supplied with cooling water via a cooling water inlet and a cooling water outlet respectively, and a cooling water half ring passage is formed in each of the cooling half rings.

In the solid working medium filling device for heat pipe with double process ports, a supporting port for the two cooling half rings is provided at the bottom of the glove box, the supporting port is coupled to the two cooling half rings, and the two cooling half rings are coupled to a process tank flange.

In the solid working medium filling device for heat pipe with double process ports, the connection between the working medium tank and the bottom surface of the glove box, the connection between the process tank flange and the two cooling half rings, the connection and between the two cooling half rings and the supporting port each employ a bayonet lap jointing which facilitates assembly and disassembly.

In the solid working medium filling device for heat pipe with double process ports, the device further includes a perforated cylinder and a weighing balance, the weighing balance is arranged outside the glove box on an upper part of a top cover of the glove box, and is connected to the perforated cylinder placed inside the glove box by a balance hook passing through a small hole in an upper cover of the glove box, and is configured to weigh of the working medium, and a plurality of through holes are provided in a side wall surface and a bottom surface of the perforated cylinder.

In the solid working medium filling device for heat pipe with double process ports, a turnover bottom is further provided at a lower end of the perforated cylinder, the turnover bottom is connected to a trigger arranged on an inner side wall of the perforated cylinder to be triggered to open or close; the trigger includes a turnover bottom driving lever and a turnover bottom driving lever control member.

In the solid working medium filling device for heat pipe with double process ports, a hanging beam is provided on an upper end of the perforated cylinder, and is connected to a hook of the perforated cylinder located inside the glove box, the hook of the perforated cylinder is connected to the balance hook of the weighing balance, and the hanging beam is in a half ring shape or an inverted-V shape.

In the solid working medium filling device for heat pipe with double process ports, the device further includes an air pillow, the air pillow is provided with an eccentric hole, and a series of holes are provided in an end surface of the air pillow on one side, the holes are in communication with a gas collecting cavity located at a central part of the air pillow, and the gas collecting cavity is in communication with the inert gas source, the inert gas passing through the air collecting cavity flows out via the holes to perform anti-oxidation protection to the working medium cut; and the eccentric hole is configured to allow the hook to pass through the air pillow from a position of a central axis of the air pillow, and allow the working medium cut to pass to fall into the perforated cylinder, and the eccentric hole is a passage for inert gas from the heat pipe to be filled to flow upwards.

In the solid working medium filling device for heat pipe with double process ports, the heater includes a first heater, a second heater assembly and a third heater, the first heater is configured to heat a cylindrical part of the working medium tank outside the glove box, the second heater assembly is configured to heat a tapered part of the working medium tank as well as a connection pipeline between the working medium tank and the heat pipe to be filled, and the third heater is configured to heat the heat pipe to be filled.

In the solid working medium filling device for heat pipe with double process ports, the first heater is wrapped on an outer wall of the cylindrical part of the working medium tank to perform heating, the third heater is wrapped on an outer wall of the heat pipe to be filled to perform heating; the second heater assembly includes a coupling member and a second heater, the coupling member has a structure of two half parts, which have a cylindrical outline after being fitted and locked closely, and the coupling member is hollowed at an inner central part to leave space for accommodating an outer wall of the tapered part and the connection pipeline, and the second heater is wrapped on an outer wall of the coupling member to perform heating.

In the solid working medium filling device for heat pipe with double process ports, the first heater, the second heater and the third heater employ thermocouples or thermal resistances to monitor temperatures and control the heating by feedback control; the temperatures are separately controlled by performing PID adjustment according to heat capacities of the three heaters respectively, temperatures of the cylindrical part and the tapered part of the working medium tank, the heat pipe to be filled, and the connection pipeline between the working medium tank and the heat pipe to be filled are allowed to reach a set value at the same time.

In the solid working medium filling device for heat pipe with double process ports, suction-exhaust pipes independent from each other are employed at corners of the glove box, and a total number of the suction-exhaust pipes employed is eight, the eight suction-exhaust pipes are collected in an exhaust pipe collecting box to exhaust air out of the glove box by a blower and an exhaust main pipe which are respectively cascaded with the exhaust pipe collecting box.

A filling method for the solid working medium filling device for heat pipe with double process ports, the method includes the following steps:

Step 1, communicating the heat pipe to be filled with the inert gas source via the auxiliary process port, communicating the working medium tank with the inert gas source via a process port in the upper cover, and displacing the air in the heat pipe to be filled and the process tank out, and at the same time, displacing the air in the glove box out;

Step 2, cutting and weighing the working medium in the glove box, and filling the working medium weighed into the process tank;

Step 3, sealing the process tank by means of the upper cover, communicating the heat pipe to be filled with a vacuum molecular pump set via the auxiliary process port, communicating the process tank with the vacuum molecular pump set via the process port in the upper cover to vacuumize the heat pipe to be filled via the main process port and the auxiliary process port simultaneously, and allow a vacuum degree to reach $10^{-3}$ Pa to $10^{-2}$ Pa;

Step 4, turning on a heater, heating, by the heater, the working medium tank, the heat pipe to be filled, a connection pipeline between the working medium tank and the heat pipe to be filled to melt the working medium in the working medium tank;

Step 5, switching off the communication between the working medium tank and the vacuum molecular pump set as well as the communication between the heat pipe to be filled and the vacuum molecular pump set, communicating the process tank with the inert gas source via the process port in the upper cover to allow the working medium in a liquid state in the process tank to enter into the heat pipe to be filled via the main process port;

Step 6, communicating the heat pipe to be filled with the vacuum molecular pump set via the auxiliary process port, communicating the process tank with vacuum molecular pump set via the process port in the upper cover to vacuumize the heat pipe to be filled via the main process port and the auxiliary process port simultaneously to allow a vacuum degree to reach a vacuum degree of $10^{-5}$ Pa to $10^{-3}$ Pa and to be maintained at the vacuum degree for 1 hour to 2 hours; and Step 7, separating the heat pipe to be filled from the process tank, and maintaining the vacuum degree of the heat pipe to be filled at $10^{-5}$ Pa to $10^{-3}$ Pa, and sealing the main process port and the auxiliary process port of the heat pipe to be filled by welding.

In the filling method for a solid working medium filling device for heat pipe with double process ports described above, the device further includes a cooler, the cooler is turned on in the Step 4, a flange gasket of the working medium tank is cooled by the cooler when the working medium tank is being heated by the heater.

In the filling method for a solid working medium filling device for heat pipe with double process ports described above, the cooler is a cooling ring formed by two cooling half rings and is sleeved on an outer surface of the working medium tank, each of the cooling half rings is supplied with cooling water through a cooling water inlet and a cooling water outlet, and a cooling water half ring passage is formed in each of the cooling half rings.

In the filling method for a solid working medium filling device for heat pipe with double process ports described above, temperatures of the working medium tank, the heat pipe to be filled, and the connection pipe between the working medium tank and the heat pipe to be filled, which temperatures are heated by the heater in the Step 4, are set to be higher a melting point of the working medium by 50 degrees Celsius to 100 degrees Celsius.

In the filling method for a solid working medium filling device for heat pipe with double process ports described above, in the Step 1, each corner of the glove box employs a separate suction-exhaust pipe, and total eight suction-exhaust pipes are employed to exhaust the air outwards and displace the air in the glove box out, the eight suction-exhaust pipes are collected in an exhaust pipe gathering box, and air is exhausted out of the glove box by a blower and an exhaust main pipe which are respectively cascaded with the exhaust pipe gathering box.

In the filling method for a solid working medium filling device for heat pipe with double process ports described above, a specific process of cutting and weighing the working medium in the glove box and filling the working medium weighed into the process tank in the Step 2 includes:

under protection of the inert gas, cutting the working medium on an air pillow placed above the process tank to remove an oxide skin, placing the working medium which is cut into a perforated cylinder in the process tank via an eccentric hole of the air pillow, and repeatedly cutting, weighing by a weighing balance located on a top of the glove box and connected to the perforated cylinder, stopping cutting when it is displayed that a design value is reached, and then taking off the air pillow, and filling the working medium in the perforated cylinder into the process tank.

In the filling method for a solid working medium filling device for heat pipe with double process ports described above, multiple through holes are provided in a side wall surface and a bottom surface of the perforated cylinder, the inert gas flowing out of the main process port flows upwards to pass through the perforated cylinder via the through holes to protect the working medium falling into the perforated cylinder during split charging, and a turnover bottom is provided at a lower end of the perforated cylinder, the turnover bottom is connected to a trigger placed inside the perforated cylinder, when the turnover bottom is triggered to open, the working medium cut is filled into the working medium tank, wherein the trigger includes a turnover bottom driving lever and a turnover bottom driving lever control member.

In the filling method for a solid working medium filling device for heat pipe with double process ports described above, a series of holes are provided in an end surface, on one side, of the air pillow, the holes are in communication with a gas collecting cavity located at a central part of the air pillow, and the gas collecting cavity is in communication with the inert gas source, the inert gas passing through the air collecting cavity flows out via the holes to perform anti-oxidation protection to the working medium cut.

In the filling method for a solid working medium filling device for heat pipe with double process ports described above, in the Step 4, the heater includes a first heater, a second heater assembly and a third heater, the first heater is configured to heat a cylindrical part of the working medium tank outside the glove box, the second heater assembly is configured to heat a tapered part of the working medium tank and a connection pipeline between the working medium tank and the heat pipe to be filled, and the third heater is configured to heat the heat pipe to be filled.

In the filling method for a solid working medium filling device for heat pipe with double process ports described above, the first heater is wrapped on an outer wall of the cylindrical part of the working medium tank to perform heating, the third heater is wrapped on an outer wall of the heat pipe to be filled to perform heating, the second heater assembly includes a coupling member and a second heater, the coupling member has a structure of two half parts, and the two half parts, after being fitted and locked closely, have a cylindrical outline, and are hollowed out at a central part inside, to leave space for accommodating an outer wall of the tapered part and the connection pipeline, and the second heater is wrapped on an outer wall of the coupling member to perform heating.

The present application has the following beneficial effects in comparison with the conventional technology.

(1) The solid working medium filling device for heat pipe in the present application is innovatively designed, design of the double process ports is adopted for the first time, the main process port functions as not only a vacuumizing port and a port for inert gas passage, but also a working medium filling port, and the auxiliary process port functions as not only a vacuumizing port but also a port for inert gas passage, thus in one aspect, exhaust passages of the heat pipe and the process tank are doubled, thereby enabling the exhaust vacuumizing to be smooth; in another aspect, during filling, all of the working medium may enter the heat pipe except for a small quantity of working medium hanged on the wall of the working medium tank, thus a filling range can be enlarged as required, a filling process is stable, the process is simple and applicable, and a special inert gas pipeline is spared.

(2) In the present application, the bottom of the glove box is coupled to the left and right cooling water rings and the upper cover of the process tank in a lap jointed manner, the lap jointing without fixing bolts not only ensures the process, but also facilitates disassembly and assembly; the design of half ring water sleeve makes it easy to assemble and disassemble, such that the space occupied by the two half ring water sleeve cooling rings can be freed up, and the process tank can be easily removed from the glove box, which easily achieves the object that the process bank can be conveniently cleaned, dried and remounted.

(3) In the present application, two ways of protection are performed in the process of split charging the working media: before the working media are split charged, the inert gas is supplied via the auxiliary process port and flows upwards in the process tank to perform anti-oxidation protection to working media for one time; and when the working media are cut in the glove box, the novel design of the air pillow with the eccentric hole additionally provides further protection for the readily-oxidizable working media in the process of split charging. N holes in an array are provided in the gas pillow, through which inert gas flows out, thus performing the anti-oxidation protection to the working fluid having been cut, thereby ensuring the purity of the working media.

(4) In the present application, the perforated cylinder with a turnover plate at the bottom is provided, the lower end of the perforated cylinder is provided with a turnover bottom, and the turnover bottom is connected to the trigger arranged inside the perforated cylinder, and may be triggered to open, which can allow the working medium which is cut to fall into the perforated cylinder. Furthermore, the side wall surface of the perforated cylinder and the turnover plate at the bottom of the perforated cylinder are provided with small holes which are uniformly and densely distributed in the wall surface, the inert gas flowing via the auxiliary process port flows upwards through the perforated cylinder via the small holes to protect the working medium falling into the perforated cylinder in the process of split-charging.

(5) In the present application, the weighing balance is arranged outside the glove box, that is, arranged on an upper part of a top cover of the glove box, the weighing balance is connected to the perforated cylinder by the hook, which not only saves space within the glove box, but also makes weighing of a large quantity of working medium be easier.

(6) In the present application, the process tank, the intermediate connection pipe and the heat pipe are heated and temperatures thereof are controlled separately in three segments in the vacuuming process. The first heater and second heater are embodied as cylindrical heating cartridges to facilitate assembling and disassembling, the second heater is wrapped in the outer wall of the transitional coupler, and the third heater is coupled to be conforming with the configuration of the heat pipe, which may be of a cylindrical type, a double-plate type, a heating rod embedded type. The way of heating in segments ensures that heated parts with different heat capacities have the same rate of temperature rise and meanwhile ensures the quality and reliability of the working medium filled.

(7) The present application employs eight independent suction and exhaust pipes at eight corners and the pipe collecting box in the glove box for the first time, and the eight pipes are fixed inside the glove box to allow the flow field of the exhausted gas in the glove box to be more uniform and the exhausting effect to be better; the present application improves the drawbacks in the conventional glove box that: each two corner areas share one exhaust pipe, an exhaust port of the exhaust pipe is located in the middle of the exhaust pipe, such that the exhaust flow field is difficult to be balanced between the two corner areas.

(8) In the present application, the design of the solid working medium filling device for heat pipe is comprehensively optimized, thereby achieving the objects that heat pipe filling range can be expanded as required, filling process is more stable, the working medium has a higher purity, the post-treatment is more convenient, the heat pipe has more superior performance, and a longer service life.

BRIEF DESCRIPTION OF THE DRAWINGS

FIG. 6 is a set of schematic views showing a heat pipe with a main process port and an auxiliary process port according to the present application, where FIG. 6a is a schematic view showing the main process port and the auxiliary process port according to the present application located on a same end of the heat pipe; FIG. 6b is a schematic view showing the main process port and the auxiliary process port according to the present application located on two ends of the heat pipe respectively; and FIG. 6c is a schematic view showing the main process port and the auxiliary process port according to the present application are located on two ends of the heat pipe (the heat pipe has a small diameter) respectively.

FIG. 7 is set of sectional views showing a glove box and eight suction-exhaust pipes provided in the glove box according to the present application, where FIG. 7a is a front sectional view of the suction pipes in the glove box according to the present application; FIG. 7b is a side sectional view of the suction pipes in the glove box according to the present application; and FIG. 7c is a top sectional view of the suction pipes in the glove box according to the present application;

FIG. 8 is a set of sectional views showing the structures of an air pillow and ports thereof according to the present application, where FIG. 8a is a front sectional view showing the structure of the air pillow according to the present application; FIG. 8b is a side sectional view showing the structure of the air pillow according to the present application; and FIG. 8c is a top sectional view showing the structure of the air pillow according to the present application;

FIG. 9 is a set of schematic views showing a perforated cylinder with a turnover bottom and a turnover bottom trigger according to the present application, where FIG. 9a is a view showing an outline of the perforated cylinder with the turnover bottom according to the present application; FIG. 9b is a schematic view of the turnover bottom trigger of the perforated cylinder with the turnover bottom according to the present application; and FIG. 9c is a schematic view of a bottom of the perforated cylinder with the turnover bottom according to the present application;

FIG. 10 is a set of schematic views showing a half ring cooling water sleeve and a water inlet and a water outlet according to the present application, where FIG. 10a is a side sectional view showing the half ring cooling water sleeve according to the present application; FIG. 10b is a schematic view showing a cooling water inlet and a cooling water outlet of the half ring cooling water sleeve according to the present application; and FIG. 10c is a front sectional view of the half ring cooling water sleeve according to the present application;

DETAILED DESCRIPTION

Figure 5:
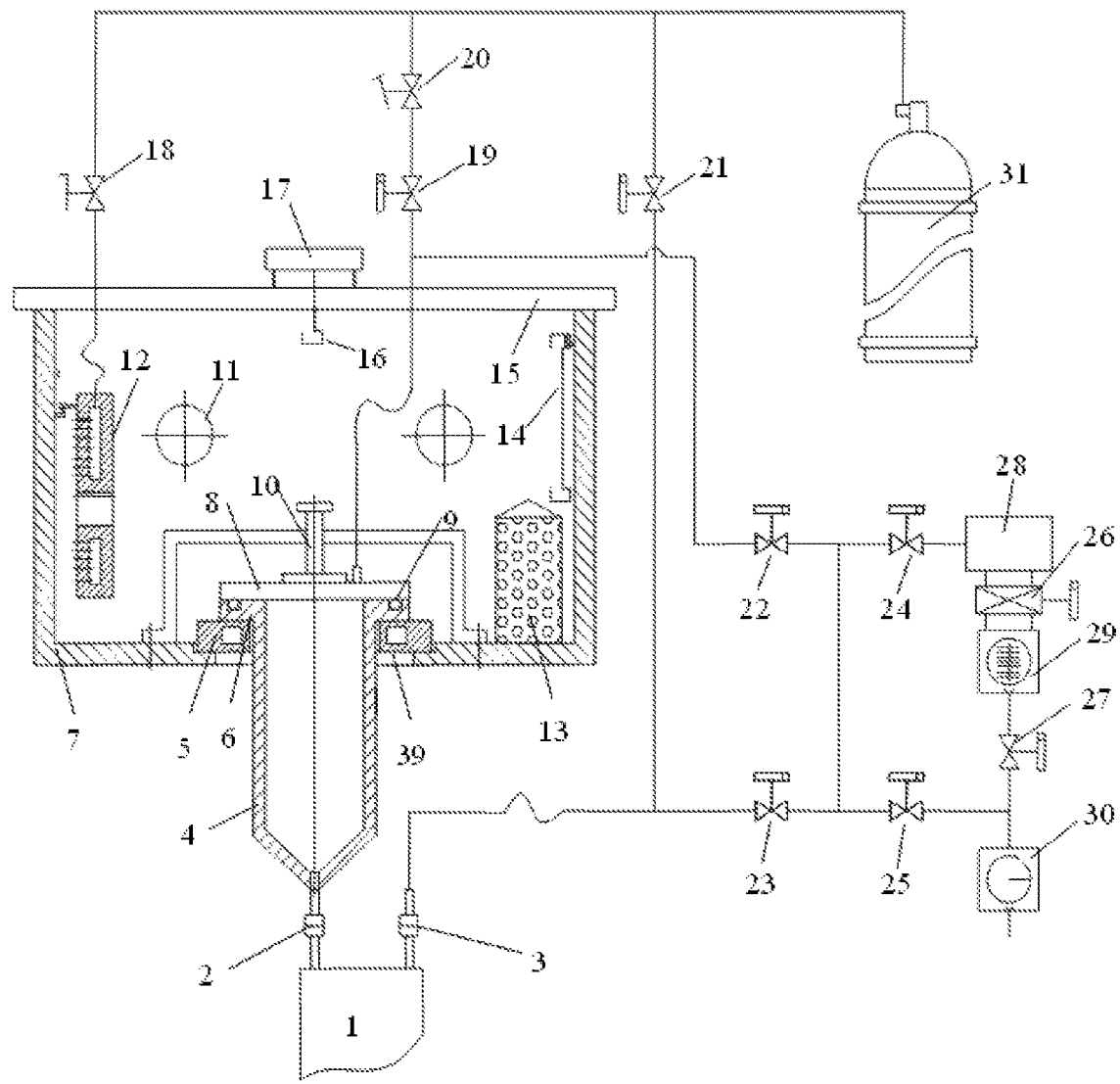
FIG. 5 is a schematic view showing the structure of a solid working medium filling device for heat pipe with double process ports according to the present application.

The present application is further described in detail hereinafter in conjunction with the drawings and embodiments:

As shown in FIG. 5, which is a schematic view showing the structure of a solid working medium filling device for heat pipe with double process ports according to the present application, it may be seen from the figure that, the solid working medium filling device for heat pipe with double process ports according to the present application includes a glove box 7, a working medium tank 4, an upper cover 8, an inert gas source 31, a vacuum molecular pump set, a heater and a cooler, a weighing balance 17, an air pillow 12 with an eccentric hole, a perforated cylinder 13, an upper cover pressing mechanism 10, two cooling water half rings 5, a sealing ring 9, a hook 14 of the perforated cylinder, a glove box cover 15, a weighing balance hook 16, an air pillow valve 18, a first upper gas charging valve 19, a micro adjustable valve 20, a second upper gas charging valve 21, an upper exhaust valve 22, a lower exhaust valve 23, a high vacuum valve 24, and a low vacuum valve 25. Specifically, the vacuum molecular pump set includes a high main valve 26, a fore shutoff valve 27, a buffer chamber 28, a molecular pump 29 and a backing pump 30. The upper cover 8 cooperates with an upper flange of the working medium tank 4, a process port in the upper cover 8 is in communication with the inert gas source 31 and the vacuum molecular pump set respectively. The heat pipe 1 to be filled is provided with a main process port and an auxiliary process port. A process pipeline is connected to a bottom end of the process tank 4 by a main process joint 2, which allows the main process port to be not only a vacuumizing port and an inert gas passage port, but also a working medium filling port. A process pipeline is connected to the inert gas source 31 and the vacuum molecular pump set by an auxiliary process joint 3, which allows the auxiliary process port to be not only a vacuumizing port but also an inert gas passage port. Specifically, the pipeline connected to the auxiliary process joint 3 is connected to the molecular pump 29 and the backing pump 30 via the lower exhaust valve 23, the low vacuum valve 25 and the fore shutoff valve 27 in the listed sequence, and is connected to the buffer chamber 28 via the high vacuum valve 24, and is connected to the inert gas source 31 via the second upper gas charging valve 21.

The working medium tank 4 has: a top end protruded into the glove box 7 through a through hole in a bottom surface of the glove box 7 and fitting closely with the glove box 7 through cooling rings; a tank body and a bottom end located outside the glove box 7; and the upper cover 8 arranged above the working medium tank 4. The process port in the upper cover 8 is in communication with the inert gas source 31 and the vacuum molecular pump set respectively. Specifically, the first upper gas charging valve 19 and the micro adjustable valve 20 are connected between the process port in the upper cover 8 and the inert gas source 31; the upper exhaust valve 22 and the high vacuum valve 24 are connected between the process port in the upper cover 8 and the buffer chamber 28; and the low vacuum valve 25 and the fore shutoff valve 27 are connected between the process port in the upper cover 8 and the molecular pump 29 and between the process port in the upper cover 8 and the backing pump 30. The air pillow valve 18 is connected between the air pillow 12 with the eccentric hole and the inert gas source 31. A flange gasket 9 of the working medium tank 4 is cooled by the cooling rings during heating, and a heater heats the tank body, the bottom end of the tank body of the working medium tank 4, the heat pipe 1 to be filled, and a connecting pipeline between the working medium tank 4 and the heat pipe 1 to be filled. Furthermore, the glove box 7 is provided with a glove hole 11 to facilitate operation.

As shown in FIG. 6, which is a set of schematic views showing a heat pipe with d a main process port and an auxiliary process port according to the present application, wherein FIG. 6a is a schematic view showing the main process port and the auxiliary process port according to the present application located on a same end of the heat pipe; FIG. 6b is a schematic view showing the main process port and the auxiliary process port according to the present application located on two ends of the heat pipe respectively; and FIG. 6c is a schematic view showing the main process port and the auxiliary process port according to the present application located on two ends of the heat pipe (the heat pipe has a small diameter) respectively. The main process port and the auxiliary process port may be located on the same end of the heat pipe 1 to be filled, or the main process port and the auxiliary process port may be located on two ends of the heat pipe 1 to be filled respectively. As shown in FIG. 6a which is a view showing the main process port and the auxiliary process port located on the same end of the heat pipe 1 to be filled, a length of, a main process port pipe 54 connected to the main process port, perpendicularly protruding into one end of a housing of the heat pipe 1 to be filled ranges from 0 mm to 10 mm; and an auxiliary process port pipe 55 connected to the auxiliary process port perpendicularly protrudes into the heat pipe 1 to be filled and is distanced from another end of the housing of the heat pipe 1 to be filled by 0 mm to 10 mm. As shown in FIG. 6b and FIG. 6c which are views showing the main process port and the auxiliary process port located on two ends of the heat pipe 1 to be filled respectively, in the case that the main process port and the auxiliary process port are located on two ends of the heat pipe 1 to be filled respectively, a length of, a main process port pipe 57 connected to the main process port, perpendicularly protruding into one end of the housing of the heat pipe 1 to be filled ranges from 0 mm to 10 mm, and a length of, an auxiliary process port pipe 58 connected to the auxiliary process port, perpendicularly protruding into another end of the housing of the heat pipe 1 to be filled ranges from 0 mm to 10 mm, and a distance between the main process port pipe 57 and the auxiliary process port pipe 58 should be as large as possible.

The heat pipe 1 to be filled can be a tubular structure or a plate like structure. In the case that the heat pipe 1 to be filled is in a plate like structure, a vertical distance between an axis of the main process port pipe 57 and an axis of the auxiliary process port pipe 58 ranges from one-second to nine-tenths of a length of a side of the plate like structure (namely a length of a side where the main process port pipe 57 or the auxiliary process port pipe 58 is connected to the heat pipe 1 to be filled, of the plate like structure). For the heat pipe 1 having a smaller diameter, the main process port and auxiliary process port may be located on two ends of the heat pipe 1 respectively, as shown in FIG. 6c.

In the present application, the auxiliary process port is connected to the device by a free end of a corrugated pipe, and the adoption of the double process ports design brings the following three benefits. Firstly, exhaust passages of the heat pipe and the process tank are doubled, thereby enabling exhausting and vacuumizing to be smooth and require less time. Secondly, during filling, all of the working medium may enter the heat pipe except for a small quantity of working medium hanged on the wall of the working medium tank, a filling range can be enlarged as required, a filling process is stable, and the process is simple and applicable. Thirdly, it is not required that a thin inert gas pipe should be provided to pass through the glove box and the process tank to protrude toward a bottom of the heat pipe so as to displace the air in the heat pipe before a single process port in a three-way structure in the conventional technology is filled.

As shown in FIG. 10 which is a set of schematic views showing a half ring cooling water sleeve and a water inlet and a water outlet according to the present application, where FIG. 10a is a side sectional view showing the half ring cooling water sleeve according to the present application; FIG. 10b is a schematic view showing a cooling water inlet and a cooling water outlet of the half ring cooling water sleeve according to the present application; and FIG. 10c is a front sectional view of the half ring cooling water sleeve according to the present application. The cooler according to the present application is a cooling ring formed by two cooling half rings 5, and is sleeved on an outer wall surface of the working medium tank 4, each of the cooling half rings 5 is supplied with cooling water via a cooling water inlet 52 and a cooling water outlet 53 respectively, and a cooling water half ring passage 51 is formed in each of the cooling half rings 5, i.e. a water passage in each of the two cooling half rings is half ring shaped.

A supporting port 39 for the two cooling half rings 5 is provided at the bottom of the glove box 7, the supporting port 39 is coupled to the two cooling half rings 5 having a large diameter, and the two cooling half rings 5 are coupled to a flange 6 of the process tank having a small diameter. The flange of the process tank 4 has a diameter smaller than an inner diameter of an opening in a bottom surface of the glove box 7. While the process tank 4 is being heated, the process tank flange gasket 9 is cooled. The connection between the working medium tank 4 and the bottom surface of the glove box 7, the connection between the process tank flange 6 and the two cooling half rings 5, and the connection between the two cooling half rings 5 and the supporting port 39 all employ a bayonet lap-joint, which is easy to assemble and disassemble. After being lap-jointed, by moving the process tank 4 upwardly and moving the two cooling half rings 5 upwardly firstly and then in radial directions which are opposite respectively, the process tank can just be downwardly removed out. The design of the half ring water sleeve of the present application makes it easy to assemble and disassemble, such that the space occupied by the two half ring water sleeve cooling rings 5 can be freed up, and the process tank 4 can be easily removed from the glove box 7, thus easily achieving the objects of conveniently cleaning, drying and remounting the process bank 4.

Figure 1:
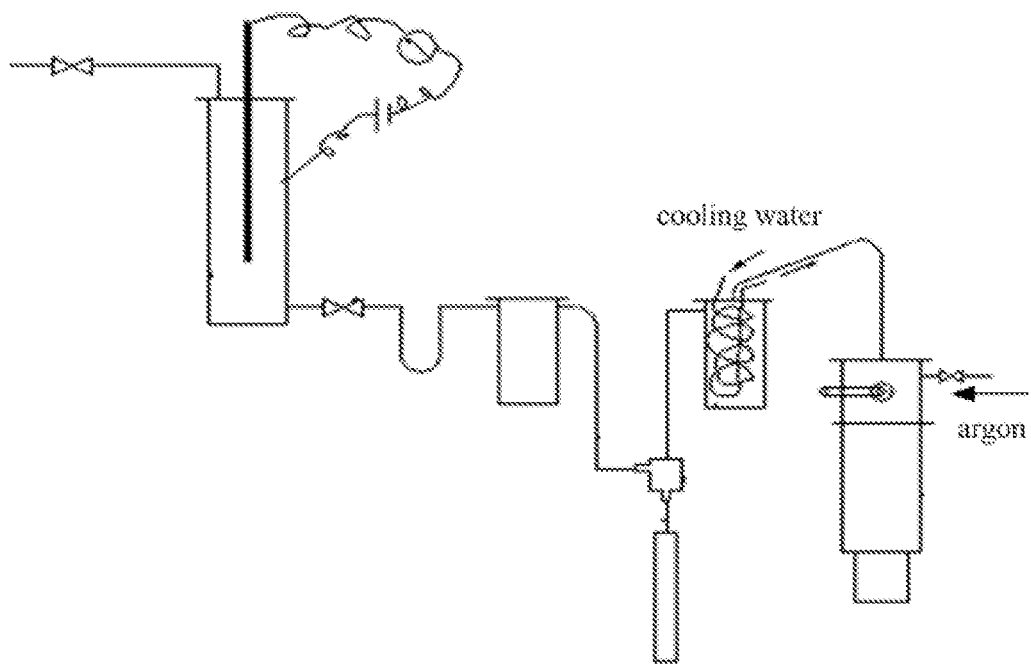
FIG. 1 is a diagram of a distilling and filling process and device of metallic sodium.
Figure 2:
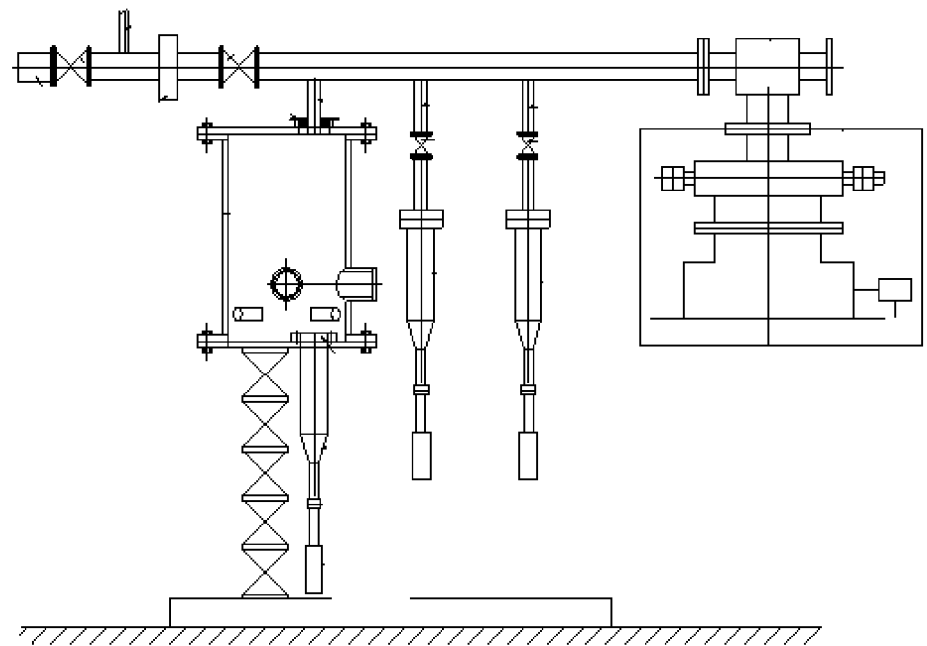
FIG. 2 is a diagram of a quantitative filling device of a solid alkali metal working medium.
Figure 3:
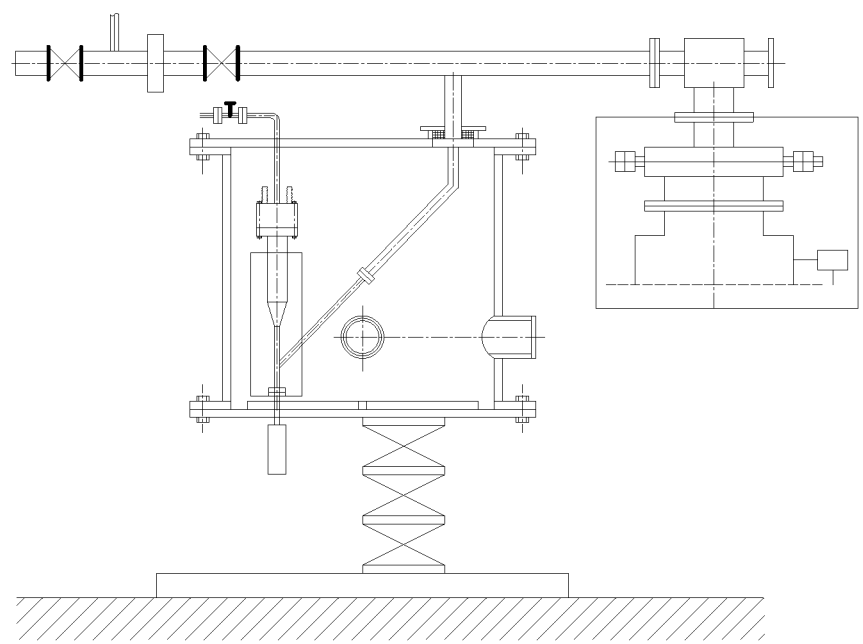
FIG. 3 shows a device for accurately filling a small high-temperature heat pipe with a solid alkali metal working medium.
Figure 4:
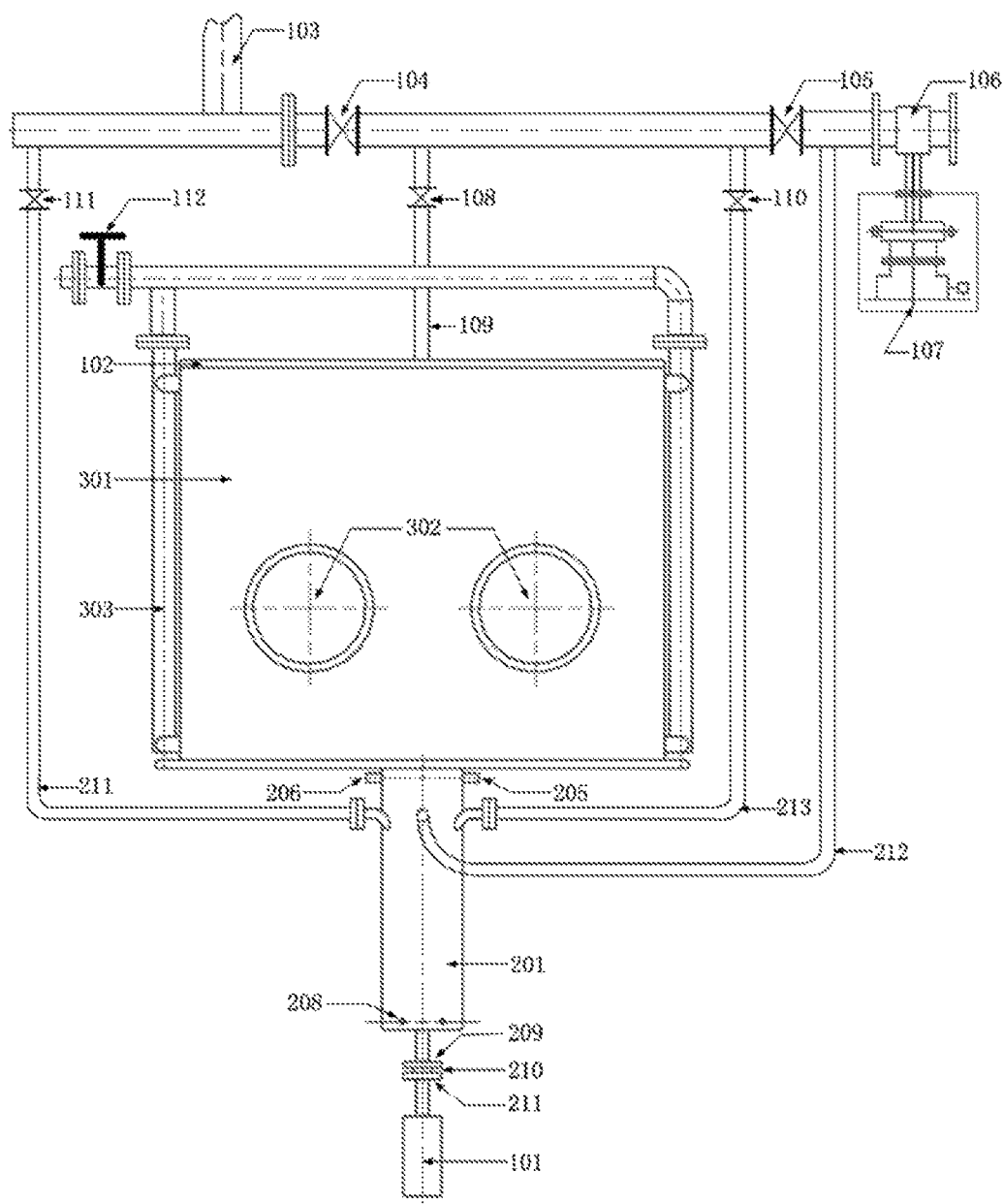
FIG. 4 is a diagram showing a method and an integrated device for an non-oxidation split charging of the alkali metal working medium.

As shown in FIG. 9, which is a set of schematic views of a perforated cylinder with a turnover bottom and a turnover bottom trigger according to the present application, where FIG. 9*a* is a view showing the appearance of the perforated cylinder with the turnover bottom according to the present application; FIG. 9*b* is a schematic view of the turnover bottom trigger of the perforated cylinder with the turnover bottom according to the present application; and FIG. 9*c* is a schematic view of a drum bottom of the perforated cylinder with the turnover bottom according to the present application. In the present application, the perforated cylinder 13 with a turnover plate at the bottom is additionally provided, that is, the perforated cylinder 13, which has an appropriate gap from a wall surface of the process tank 4 and an appropriate size, is provided in the process tank 4. A turnover bottom 47 is provided at a lower end of the perforated cylinder, the turnover bottom 47 is connected with a trigger arranged on an inner side wall of the perforated cylinder 13, so that the turnover bottom can be triggered to open and close. The trigger includes a turnover bottom driving lever 48 and a turnover bottom driving lever control member 50, the turnover bottom driving lever control member 50 is a circular ring fixed on the wall surface of the perforated cylinder 13, and the turnover bottom driving lever 48 passes through the turnover bottom driving lever control member 50 to be connected to an edge of the turnover bottom 47. A hanging beam 46 is provided on an upper end of the perforated cylinder 13, and is connected to the hook 14 of the perforated cylinder inside the glove box 7. The hook 14 of the perforated cylinder is connected to the balance hook 16 of the weighing balance 17 for weighting the working medium. The hanging beam 46 is in a half ring shape or an inverted-V shape. As shown in FIG. 1, the weighing balance 17 is arranged outside the glove box 7, that is, arranged on an upper part of a top cover of the glove box 7, the hook 16 protrudes out from a hole in a bottom of the weighing balance 17 and passes through a top surface of the glove box 7 to be connected to the hook 14 of the perforated cylinder. The hook 14 of the hook of the perforated cylinders the perforated cylinder 13 arranged inside the process tank 4, such that the perforated cylinder 13 is suspended in the process tank 4. The weighing balance 17 may show a total mass of the perforated cylinder 13 and the working media continuously added into the perforated cylinder 13. Such a coupled design not only saves space within the glove box 7, but also makes weighing of a large quantity of working medium to be easy.

Furthermore, the side wall surface and a bottom surface of the perforated cylinder 13 are provided with holes 49 which are uniformly and densely distributed, an inert gas flowing out via the main process port flows upwardly to pass through the perforated cylinder 13 via the through holes 49, thus protecting the working medium falling into the perforated cylinder 13 during split charging.

As shown in FIG. 8, which is a set of sectional views showing the structures of an air pillow and ports thereof according to present application, where FIG. 8*a* is a front sectional view showing the structure of the air pillow according to the present application; FIG. 8*b* is a side view showing the structure of the air pillow according to the present application; and FIG. 8*c* is a top view showing the structure of the air pillow according to the present application. The air pillow 12 is provided with an eccentric hole 45, and the eccentric hole 45 passes through a center of the air pillow 12. A series of holes 41 are provided in an end surface, on one side, of the air pillow 12, the holes 41 are in communication with a gas collecting cavity 42 located at a central portion of the air pillow 12, and the gas collecting cavity 42 is in communication with the inert gas source 31. The inert gas passing through the gas collecting cavity 42 flows through the holes 41 to perform anti-oxidation protection to the working medium. The eccentric hole 45 is configured to allow the hook 14 of the perforated cylinder 13 to pass through (the hook 14 passes through the eccentric hole and the center of the air pillow 12), and further allow the cut working medium to fall into the perforated cylinder 13, and the eccentric hole 45 is also a passage for inert gas from the heat pipe 1 to be filled to flow upwardly. The hook 14 is located at a central axis of the air pillow 12, and passes through the eccentric hole 45 with the hook 14 close to an edge of the eccentric hole 45, thus facilitating passing of the working medium with a large size through the eccentric hole 45. A gas pipe joint 43 in communication with the gas collecting cavity 12 is in communication with the inert gas source 31 via the air pillow valve 18. The air pillow 12 is hung on the side wall of the glove box 4 by means of a hook 44 when the working medium is not cut.

Figure 12:
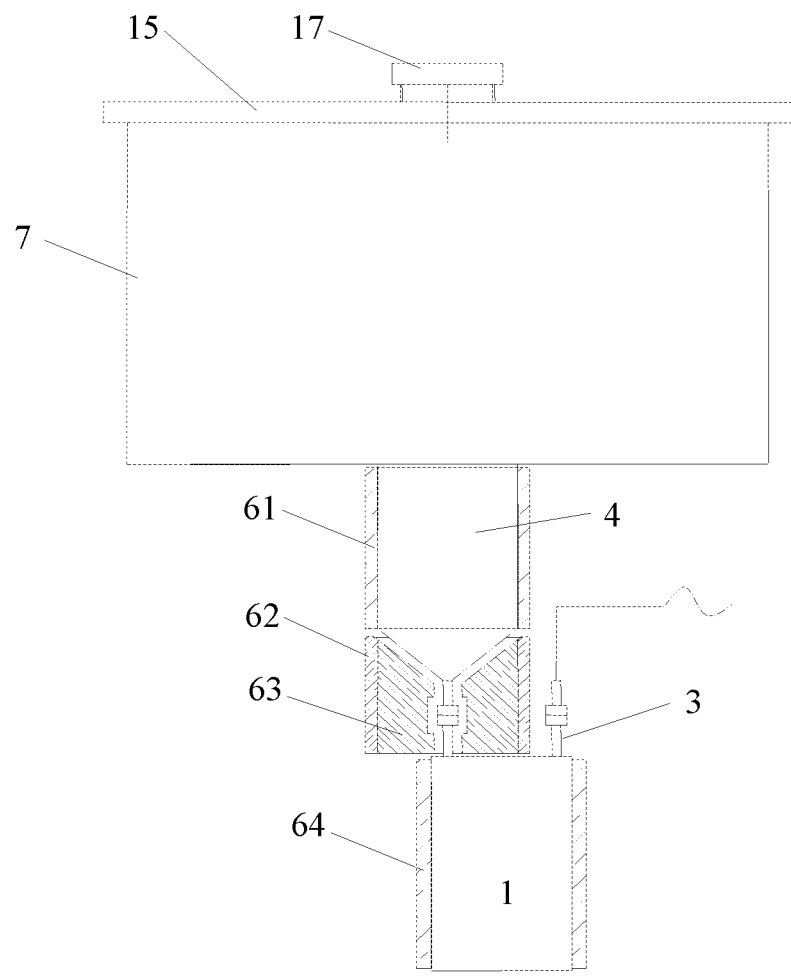
FIG. 12 is a schematic view of three segments of heaters and an intermediate coupling structure according to the present application.

As shown in FIG. 12 which is a schematic view showing three segments of heaters and an intermediate coupling structure, it can be seen that in the present application, the tank body of the process tank 7, an intermediate connecting pipe and the heat pipe 1 to be filled are separately heated and temperatures thereof are separately controlled in three segments during the vacuumizing process. A first heater 61 is wrapped outside a wall of a cylindrical cavity which is lower than the flange of the process tank 4 by a certain distance. In an axial direction, a second heater 62 starts from an outer side of a wall of a tapered cavity located at a lower part of the process tank 4 and extends till a root section of a main filling pipe of the heat pipe 1. The second heater 62 is wrapped on an outer wall of a transitional coupling member 63. The coupling member 63 is embodied as a structure with two half parts, and the two half parts, after being fit and locked closely, have a cylinder shape. The coupling member 63 is hollowed at an inside central part thereof, so as to leave space for accommodating the wall of the tapered cavity, the connection pipe and the joint. Each of the first heater 61 and the second heater 62 is embodied as a cylindrical heating cartridge, which facilitates assembly and disassembly. A third heater 64 is wrapped on an outer wall of the heat pipe 1, and the heater 64 located on the outer wall of the heat pipe 1 is also required to be coupled to conform with an outline of the heat pipe 1, which may be of a cylindrical type, a double-plate type, a heating rod embedded type. When the first heater, the second heater and the third heater heat corresponding parts, thermocouples or thermal resistances are employed to monitor temperatures of the wall of the process tank 4, the main process port pipe and the wall surface of the heat pipe respectively and a feedback control is performed to the heating, and separate temperature control is performed with a PID adjustment according to heat capacities of the three heaters, thus allowing temperatures of the cylindrical part of the working medium tank 4, the tapered part, the heat pipe 1 to be filled, and the connecting pipe between the working medium tank 4 and the heat pipe 1 to be filled, to reach a set value at the same time.

As shown in FIG. 7, which is set of sectional views showing a glove box and eight suction-exhaust pipes provided in the glove box according the present application, where FIG. 7a is a front sectional view of the suction pipes in the glove box according to the present application; FIG. 7b is a side sectional view of the suction pipes in the glove box according to the present application; and FIG. 7c is a top sectional view of the suction pipes in the glove box according to the present application, it may be seen that corners of the glove box 7 employ suction-exhaust pipes 33 independent from each other, and a total number of the suction-exhaust pipes 33 employed is eight. The eight suction-exhaust pipes 33 are collected in an exhaust pipe collecting box 34 and discharge air out of the glove box 7 via a blower and an exhaust main pipe 35 which are respectively concatenated to the exhaust pipe collecting box 34. The suction-exhaust pipes 33 are arranged at corners of the glove box 7 inside or outside the glove box 7, and are fixed on the wall surface of the glove box 7 by a suction-exhaust pipe fixing clip 32. In the case that the suction-exhaust pipes 33 are arranged at the corners of the glove box 7 outside the glove box 7, it is required to provide holes in the eight corner areas. Such a design makes a flow field of the exhausted air in the glove box 7 be uniform, and the effect of air exhausting be good.

In the present application, the control to pneumatic valves, the three segments of heaters and the like is implemented by a Programmable Logic Controller (PLC). The gas charging valve, the gas exhausting valve and the like are embodied as ultra-high vacuum pneumatic valves. The gas charging valve of the main process port requires flow adjustment, therefore, the micro adjustable valve is connected in series to the gas charging valve. By using the PLC to control valves and temperature, a one-key control may be adopted after a certain quantity of working medium is sealed in the process tank by the upper flange, thus reducing the influence of human factors, and allowing the critical preparing process of heat pipe filling to have a high stability.

A filling method for a solid working medium filling device for heat pipe with double process ports according to the present application specifically includes the following steps.

Figure 11:
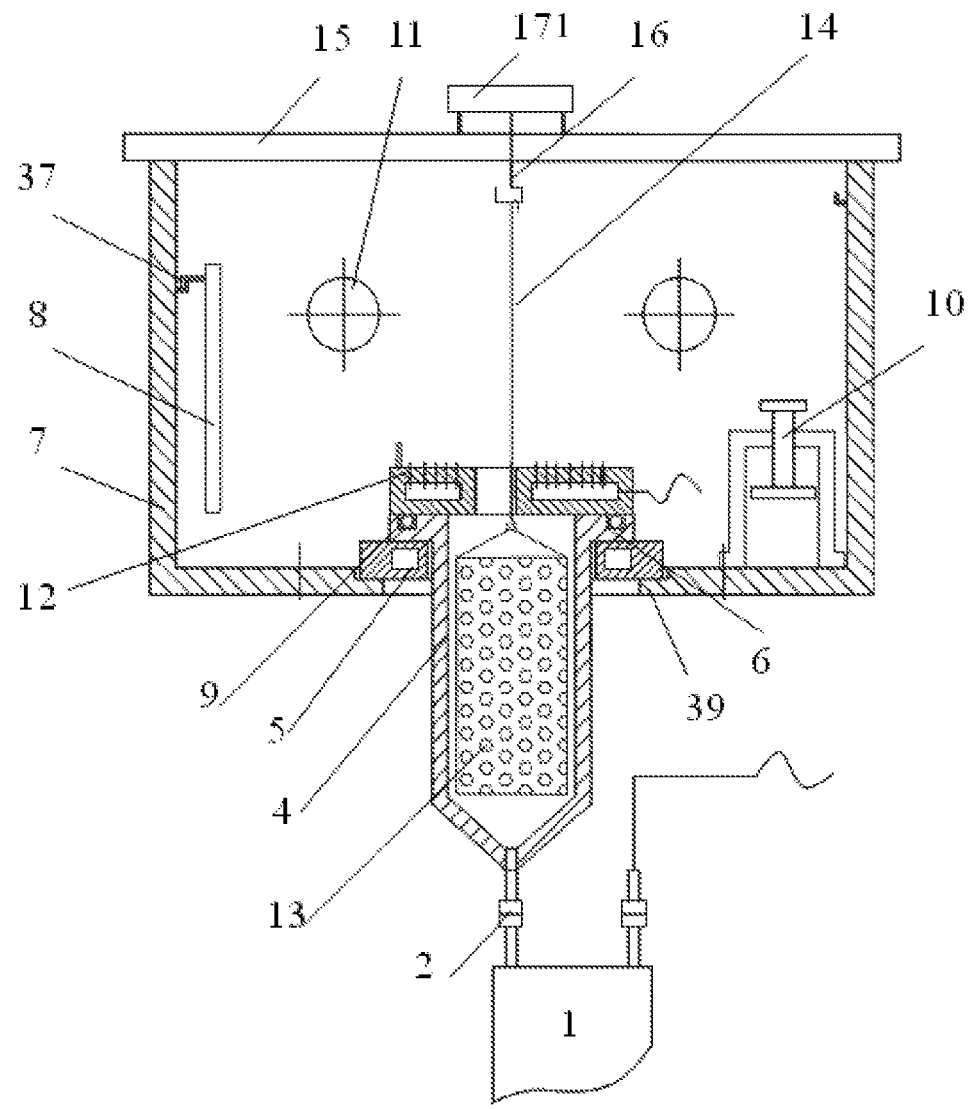
FIG. 11 is a view showing positions of components and process in operation of the glove box according to the present application.

Step 1, pre-treatment, including: cleaning a work space and related components, checking pipes and valves, and ensuring the circuit to be normal; hermetically connecting the filling device to the heat pipe 1 to be filled (tubular structure or plate like structure) by the main process joint 2 and the auxiliary process joint 3; placing a bottle containing a working medium, a cutting knife and the like into the glove box 7 via a glove hole 11; placing a perforated cylinder 13 into the process tank 4, arrange the air pillow 12 in place, connecting the hook 14 of the perforated cylinder and the balance hook 16 between the perforated cylinder 13 and the weighing balance 17, connecting a glove ports till a sealing effect is achieved, as shown in FIG. 11 which is a diagram illustrating positions of the components and process in operation of the glove box according to the present application; and weighing and recording a mass of the screen cylinder 13 which is empty.

Step 2, air displacement, including: turning on the suction-exhaust blower, and discharging air out of the glove box 7 continuously via the eight suction-exhaust pipes 33 and the exhaust main pipe 35; displacing, by the inert gas source 31, the air in the heat pipe 1 to be filled via the second upper gas charging valve 21 and the auxiliary process joint 3; replenishing an inert gas into the air pillow 12 via the air pillow valve 18, meanwhile connecting the process tank 4 to the inert gas source 31 via the process port in the upper cover 8 connected to the first upper gas charging valve 19 and the micro adjustable valve 20 and replenishing the inert gas into the process tank 4; exhausting the air in the heat pipe 1 and the glove box 7, and the heat pipe 1, the process tank 4 the glove box 7 and respective pipelines are full of the inert gas after a short time (e. g. 3 minutes to 5 minutes).

Step 3, cutting and weighing working medium. Under protection of the inert gas, the working medium are cut on the air pillow 12 placed above the process tank 4 to remove an oxide skins, the working medium cut is placed into the perforated cylinder 13 in the process tank 4 via the eccentric hole 45 of the air pillow 12, the cutting of working medium is repeated, the working medium cut is weighed by the weighing balance 17 located on a top of the glove box 7 and connected to the perforated cylinder 13, and the cutting is stopped when it is displayed that a weight of the working medium cut reaches a design value, then the air pillow valve 18 is closed, the air pillow 12 is taken off and is hung on the side wall of the glove box by the hook 44; and the perforated cylinder 13 is taken out, meanwhile the turnover bottom 47 is controlled by the turnover bottom driving lever 48 to allow the working medium to fall into the process tank 4; and the perforated cylinder 13 is hung onto another hook on the side wall of the glove box.

Step 4, vacuumizing, exhausting and heating. A position of the sealing ring 9 is adjusted in place, and the upper cover 8 is pressed by the upper cover pressing mechanism 10 to achieve sealing of the process tank. The first upper gas charging valve 19 and the second upper gas charging valve 21 are closed. The heat pipe 1 is in communication with the vacuum molecular pump set via the auxiliary process port, and the process tank 4 is in communication with the vacuum molecular pump set via the process port in the upper cover 8 to vacuumize the heat pipe 1 to be filled via the main process port and the auxiliary process port simultaneously, and allow a vacuum degree to reach $10^{-3}$ Pa to $10^{-2}$ Pa;

A power supply to a cooling water pump for the two cooling water half rings 5 are turned on; and a power supply to the first heater 61, the second heater 62 and the third heater 64 are turned on. The process tank 4, the heat pipe 1 to be filled, the connection pipeline between the working medium tank 4 and the heat pipe 1 to be filled are heated to reach a set temperature value, and maintained at the temperature for a sufficient time to completely melt the working medium in the process tank 4. The temperatures of the working medium tank 4, the heat pipe 1 to be filled, and the connection pipeline between the working medium tank 4 and the heat pipe 1 to be filled, which temperatures are heated by the heater, are generally set to higher than a melting point of the working medium by 50 degrees Celsius to 100 degrees Celsius. Different working medium have different temperature levels, for example, for sodium, the melting point is 98 degrees Celsius, and the heating temperature is set to be 150 degrees Celsius. After the heating is started, the attained degree of vacuum is maintained for a certain period of time, for example, 1 hour to 2 hours.

Step 5, inert gas supplying and working medium filling. The communication between the working medium tank 4 and the vacuum molecular pump set as well as the communication between the heat pipe 1 to be filled and the vacuum molecular pump set are cut off, the micro adjustable valve 20 is maintained in an opened state after being appropriately adjusted, and the first upper gas charging valve 19 is opened to communicate the process tank 4 with the inert gas source 31, the liquid working medium in the process tank 4 is pressed out of the process tank 4 and all entered into the heat pipe 1 to be filled.

Step 6, vacuumizing and exhausting gas again. The first upper gas charging valve 19 is closed, and the upper exhaust valve 22 and the lower exhaust valve 23 are opened, the high vacuum valve 24 is opened and the low vacuum valve 25 is closed, the heat pipe 1 to be filled is in communication with the vacuum molecular pump set by the auxiliary process port, and the process tank 4 is in communication with the vacuum molecular pump set by the process port in the upper cover 8 to vacuumize the heat pipe 1 to be filled via the main process port and the auxiliary process port simultaneously, and allow a vacuum degree to reach $10^{-5}$ Pa to $10^{-3}$ Pa and to be maintained at the vacuum degree for 1 hour to 2 hours.

Step 7, pinching off and welding. Process pipes below the main process joint 2 and the auxiliary process joint 3 of the heat pipe 1 are respectively pinched off by a hydraulic tong, and the heat pipe 1 to be filled is separated from the process tank 4, the main process port and the auxiliary process port of the heat pipe 1 to be filled are sealed by welding, and in the welding process, a vacuum degree in the heat pipe 1 to be filled is maintained at $10^{-5}$ Pa to $10^{-3}$ Pa.

Step 8, post-treatment. The valves of the device and the vacuum molecular pump set are closed. Process pipe heads below the main process joint 2 and the auxiliary process joint 3 are taken off separately. The two process pipe heads and the heat pipe 1 are weighed together to determine a final mass of the work medium filled. The process tank is disassembled and cleaned and then reassembled to complete the technological process.

The embodiments described hereinabove are only best embodiments of the present application, and should not be interpreted as limitation to the protection scope of the present application. Any variations or substitutions easily conceived by those skilled in the art within the technical scope disclosed in the present application are also deemed to fall into the scope of the present application.

The contents not described in detail in the description of the present application pertain to widely-known technology for those skilled in the art.

What is claimed is:

1. A solid working medium filling device for heat pipe with double process ports, comprising: a working medium tank, an inert gas source, and a vacuum molecular pump set, an upper cover arranged on an upper side of the working medium tank, a process port in the upper cover is in communication with the inert gas source and the vacuum molecular pump set respectively, and a heat pipe to be filled comprising two process ports which are respectively a main process port and an auxiliary process port, wherein the heat pipe to be filled is in communication with a bottom of the working medium tank via the main process port to allow the main process port to be a vacuumizing port and an inert gas passage port as well as a working medium filling port; and the heat pipe to be filled is in communication with the inert gas source and the vacuum molecular pump set via the auxiliary process port to allow the auxiliary process port to be a vacuumizing port as well as a port for inert gas passage.

2. The solid working medium filling device for heat pipe with double process ports according to claim 1, wherein the device further comprises a glove box and a heater, a top end of the working medium tank protrudes into the glove box through a through hole in a bottom surface of the glove box and is fitted closely with the glove box, a tank body and a bottom end of the tank body are located outside the glove box.

3. The solid working medium filling device for heat pipe with double process ports according to claim 1, wherein the main process port and the auxiliary process port of the heat pipe to be filled are located on a same end of the heat pipe to be filled, or the main process port and the auxiliary process port are located on two ends of the heat pipe to be filled respectively.

4. The solid working medium filling device for heat pipe with double process ports according to claim 3, wherein in the case that the main process port and the auxiliary process port are located on the same end of the heat pipe to be filled, a main process port pipe connected to the main process port protrudes perpendicularly into one end of a housing of the heat pipe to be filled by 0 mm to 10 mm; and an auxiliary process port pipe connected to the auxiliary process port protrudes perpendicularly into the heat pipe to be filled and is distanced from another end of the housing of the heat pipe to be filled by 0 mm to 10 mm.

5. The solid working medium filling device for heat pipe with double process ports according to claim 3, wherein in the case that the main process port and the auxiliary process port are located on the two ends of the heat pipe to be filled respectively, a main process port pipe connected to the main process port protrudes perpendicularly into one end of a housing of the heat pipe to be filled by 0 mm to 10 mm; and an auxiliary process port pipe connected to the auxiliary process port protrudes perpendicularly into another end of the housing of the heat pipe to be filled by 0 mm to 10 mm.

6. The solid working medium filling device for heat pipe with double process ports according to claim 3, wherein in the case that the heat pipe to be filled is a plate structure, a vertical distance between a central line of a main process port pipe and a central line of an auxiliary process port pipe ranges from one-second to nine-tenths of a length of a side, where the main process port pipe or the auxiliary process port pipe is connected to the heat pipe to be filled, of the plate structure.

7. The solid working medium filling device for heat pipe with double process ports according to claim 2, wherein the device further comprises a cooler, a flange gasket of the working medium tank is cooled by the cooler while the working medium tank is being heated by the heater.

8. The solid working medium filling device for heat pipe with double process ports according to claim 7, wherein the cooler is a cooling ring formed by two cooling half rings, and is sleeved on an outer wall surface of the working medium tank, each of the cooling half rings is supplied with cooling water via a cooling water inlet and a cooling water outlet respectively, and a cooling water half ring passage is formed in each of the cooling half rings.

9. The solid working medium filling device for heat pipe with double process ports according to claim 8, wherein a supporting port for the two cooling half rings is provided at the bottom of the glove box, the supporting port is coupled to the two cooling half rings, and the two cooling half rings are coupled to a process tank flange.

10. The solid working medium filling device for heat pipe with double process ports according to claim 9, wherein a connection between the working medium tank and the bottom surface of the glove box, a connection between the process tank flange and the two cooling half rings, and a connection between the two cooling half rings and the supporting port each employ a bayonet lap-jointing which facilitates assembly and disassembly.

11. The solid working medium filling device for heat pipe with double process ports according to claim 2, wherein the device further comprises a perforated cylinder and a weighing balance, the weighing balance is arranged outside the glove box, and is connected to the perforated cylinder placed inside the glove box by a balance hook passing through a small hole in an upper cover of the glove box, and is configured to weigh of the working medium, and a plurality of through holes are provided in a side wall surface and a bottom surface of the perforated cylinder.

12. The solid working medium filling device for heat pipe with double process ports according to claim 11, wherein a turnover bottom is further provided at a lower end of the perforated cylinder, the turnover bottom is connected to a trigger arranged on an inner side wall of the perforated cylinder to be triggered to open or close; the trigger comprises a turnover bottom driving lever and a turnover bottom driving lever control member.

13. The solid working medium filling device for heat pipe with double process ports according to claim 12, wherein a hanging beam is provided on an upper end of the perforated cylinder, and is connected to a hook of the perforated cylinder located inside the glove box, the hook of the perforated cylinder is connected to the balance hook of the weighing balance, and the hanging beam is in a half ring shape or an inverted-V shape.

14. The solid working medium filling device for heat pipe with double process ports according to claim 1, wherein: the device further comprises an air pillow, the air pillow is provided with an eccentric hole, and a series of holes are provided in an end surface of the air pillow on one side, the holes are in communication with a gas collecting cavity located at a central part of the air pillow, and the gas collecting cavity is in communication with the inert gas source, the inert gas passing through the air collecting cavity flows out via the holes to perform anti-oxidation protection to a working medium cut; and the eccentric hole is configured to allow the hook to pass through the air pillow from a position of a central axis of the air pillow, and allow the working medium cut to pass to fall into the perforated cylinder, and the eccentric hole is a passage for inert gas from the heat pipe to be filled to flow upwards.

15. The solid working medium filling device for heat pipe with double process ports according to claim 2, wherein the heater comprises a first heater, a second heater assembly and a third heater, the first heater is configured to heat a cylindrical part of the working medium tank outside the glove box, the second heater assembly is configured to heat a tapered part of the working medium tank as well as a connection pipeline between the working medium tank and the heat pipe to be filled, and the third heater is configured to heat the heat pipe to be filled.

16. The solid working medium filling device for heat pipe with double process ports according to claim 15, wherein: the first heater is wrapped on an outer wall of the cylindrical part of the working medium tank to perform heating, the third heater is wrapped on an outer wall of the heat pipe to be filled to perform heating; and the second heater assembly comprises a coupling member and a second heater, the coupling member has a structure of two half parts, which have a cylindrical outline after being fitted and locked closely, and the coupling member is hollowed at an inner central part to leave space for accommodating an outer wall of the tapered part and the connection pipeline, and the second heater is wrapped on an outer wall of the coupling member to perform heating.

17. The solid working medium filling device for heat pipe with double process ports according to claim 16, wherein the first heater, the second heater and the third heater employ thermocouples or thermal resistances to monitor temperatures and control the heating by feedback control; the temperatures are separately controlled by performing PID adjustment according to heat capacities of the three heaters respectively, temperatures of the cylindrical part and the tapered part of the working medium tank, the heat pipe to be filled, and the connection pipeline between the working medium tank and the heat pipe to be filled are allowed to reach a set value at the same time.

18. The solid working medium filling device for heat pipe with double process ports according to claim 2, wherein suction-exhaust pipes independent from each other are employed at corners of the glove box, and a total number of the suction-exhaust pipes employed is eight, the eight suction-exhaust pipes are collected in an exhaust pipe collecting box to exhaust air out of the glove box by a blower and an exhaust main pipe which are respectively cascaded with the exhaust pipe collecting box.

19. A filling method for the solid working medium filling device for heat pipe with double process ports according to claim 2, wherein the method comprises the following steps: Step 1, communicating the heat pipe to be filled with the inert gas source via the auxiliary process port, communicating the working medium tank with the inert gas source via a process port in the upper cover, and displacing air in the heat pipe to be filled and the tank with the inert gas, and at the same time, displacing air in the glove box with the inert gas; Step 2, cutting and weighing the working medium in the glove box, and filling the working medium weighed into the tank; Step 3, sealing the tank by means of the upper cover, communicating the heat pipe to be filled with a vacuum molecular pump set via the auxiliary process port, communicating the tank with the vacuum molecular pump set via the process port in the upper cover to vacuumize the heat pipe to be filled via the main process port and the auxiliary process port simultaneously, and allow a vacuum degree to reach 10'3 Pa to 10' 2 Pa; Step 4, turning on a heater, heating, by the heater, the working medium tank, the heat pipe to be filled, a connection pipeline between the working medium tank and the heat pipe to be filled to melt the working medium in the working medium tank; Step 5, switching off the communication between the working medium tank and the vacuum molecular pump set as well as the communication between the heat pipe to be filled and the vacuum molecular pump set, communicating the tank with the inert gas source via the process port in the upper cover to allow the working medium in a liquid state in the tank to enter into the heat pipe to be filled via the main process port; Step 6, communicating the heat pipe to be filled with the vacuum molecular pump set via the auxiliary process port, communicating the tank with vacuum molecular pump set via the process port in the upper cover to vacuumize the heat pipe to be filled via the main process port and the auxiliary process port simultaneously to allow a vacuum degree to reach a vacuum degree of 10' 5 Pa to 10'3 Pa and to be maintained at the vacuum degree for 1 hour to 2 hours; and Step 7, separating the heat pipe to be filled from the tank, and maintaining the vacuum degree of the heat pipe to be filled at 10'5 Pa to 10'3 Pa, and sealing the main process port and the auxiliary process port of the heat pipe to be filled by welding.

20. The filling method for the solid working medium filling device for heat pipe with double process ports according to claim 19, wherein the device further comprises a cooler, the cooler is turned on in the Step 4, a flange gasket of the working medium tank is cooled by the cooler when the working medium tank is being heated by the heater.

21. The filling method for the solid working medium filling device for heat pipe with double process ports according to claim 20, wherein the cooler is a cooling ring formed by two cooling half rings and is sleeved on an outer surface of the working medium tank, each of the cooling half rings is supplied with cooling water through a cooling water inlet and a cooling water outlet, and a cooling water half ring passage is formed in each of the cooling half rings.

22. The filling method for the solid working medium filling device for heat pipe with double process ports according to claim 19, wherein temperatures of the working medium tank, the heat pipe to be filled, and the connection pipe between the working medium tank and the heat pipe to be filled, which temperatures are heated by the heater in the Step 4, are set to be higher a melting point of the working medium by 50 degrees Celsius to 100 degrees Celsius.

23. The filling method for the solid working medium filling device for heat pipe with double process ports according to claim 19, wherein in the Step 1, each corner of the glove box employs a separate suction-exhaust pipe, and total eight suction-exhaust pipes are employed to exhaust the air outwards and displace the air in the glove box out, the eight suction-exhaust pipes are collected in an exhaust pipe gathering box, and air is exhausted out of the glove box by a blower and an exhaust main pipe which are respectively cascaded with the exhaust pipe gathering box.

24. The filling method for the solid working medium filling device for heat pipe with double process ports according to claim 19, wherein a specific process of cutting and weighing the working medium in the glove box and filling the working medium weighed into the tank in the Step 2 comprises: under protection of the inert gas, cutting the working medium on an air pillow placed above the tank to remove an oxide skin, placing the working medium which is cut into a perforated cylinder in the tank via an eccentric hole of the air pillow, and repeatedly cutting, weighing by a weighing balance located on a top of the glove box and connected to the perforated cylinder, stopping cutting when it is displayed that a design value is reached, and then taking off the air pillow, and filling the working medium in the perforated cylinder into the tank.

25. The filling method for the solid working medium filling device for heat pipe with double process ports according to claim 24, wherein a plurality of through holes are provided in a side wall surface and a bottom surface of the perforated cylinder, the inert gas flowing out of the main process port flows upwards to pass through the perforated cylinder via the through holes to protect the working medium which falls into the perforated cylinder during split charging, and a turnover bottom is provided at a lower end of the perforated cylinder, the turnover bottom is connected to a trigger placed inside the perforated cylinder, when the turnover bottom is triggered to open, the working medium cut is filled into the working medium tank, wherein the trigger comprises a turnover bottom driving lever and a turnover bottom driving lever control member.

26. The filling method for the solid working medium filling device for heat pipe with double process ports according to claim 24, wherein a series of holes are provided in an end surface, on one side, of the air pillow, the holes are in communication with a gas collecting cavity located at a central part of the air pillow, and the gas collecting cavity is in communication with the inert gas source, the inert gas passing through the air collecting cavity flows out via the holes to perform anti-oxidation protection to the working medium cut.

27. The filling method for the solid working medium filling device for heat pipe with double process ports according to claim 19, wherein in the Step 4, the heater comprises a first heater, a second heater assembly and a third heater, the first heater is configured to heat a cylindrical part of the working medium tank outside the glove box, the second heater assembly is configured to heat a tapered part of the working medium tank and a connection pipeline between the working medium tank and the heat pipe to be filled, and the third heater is configured to heat the heat pipe to be filled.

28. The filling method for the solid working medium filling device for heat pipe with double process ports according to claim 27, wherein the first heater is wrapped on an outer wall of the cylindrical part of the working medium tank to perform heating, the third heater is wrapped on an outer wall of the heat pipe to be filled to perform heating, the second heater assembly comprises a coupling member and a second heater, the coupling member has a structure of two half parts, and the two half parts, after being fitted and locked, have a cylindrical outline, and are hollowed out at a central part inside, to leave space for accommodating an outer wall of the tapered part and the connection pipeline, and the second heater is wrapped on an outer wall of the coupling member to perform heating.

* * * * *